ELECTROMECHANICAL FREQUENCY RESPONSIVE TRANSLATING DEVICE

Original Filed Jan. 31, 1964 2 Sheets-Sheet 1

INVENTORS.
Charles W. Mooney and
Alfred J. Holzinger
By Mueller & Aichele
Attys

ELECTROMECHANICAL FREQUENCY RESPONSIVE TRANSLATING DEVICE

Original Filed Jan. 31, 1964 2 Sheets-Sheet 2

INVENTOR.
Charles W. Mooney and
Alfred S. Holzinger
By Mueller & Aichele
Attys.

United States Patent Office

Re. 26,361
Reissued Mar. 12, 1968

26,361

ELECTROMECHANICAL FREQUENCY RESPONSIVE TRANSLATING DEVICE

Charles W. Mooney, Mount Prospect, and Alfred S. Holzinger, Chicago, Ill., assignors to Motorola, Inc., Chicago, Ill., a corporation of Illinois Original No. 3,221,120, dated Nov. 30, 1965, Ser. No. 341,508, Jan. 31, 1964. Application for reissue Nov. 29, 1966, Ser. No. 606,494

18 Claims. (Cl. 335—90)

Matter enclosed in heavy brackets [ ] appears in the original patent but forms no part of this reissue specification; matter printed in italics indicates the additions made by reissue.

*ABSTRACT OF THE DISCLOSURE*

*Electromechanical frequency responsive device including rectangular chassis with vibratory reed therein having one end supported on chassis and elongated permanent magnet extending transversely at the opposite end. A drive coil surrounds one end of the magnet and a pick-up coil surrounds the other end. Conductive shields are provided about the coils and conductive sleeves may be provided therein. The chassis is mounted in a frame with one end supported by conducting coil springs which provide electrical connections and the other end supported by a resilient boot which provides damping.*

This invention relates to electromechanical frequency responsive translating devices, and more particularly to such a device adapted for use in selective tone signalling apparatus for communications systems.

In selective tone signalling apparatus, a mechanically resonant structure may be utilized as the frequency controlling element for generation of a given tone signal, or as a frequency responsive device for controlling an operation in response to a given tone signal. A tone of a given frequency derived from a generator including such a resonant device may be transmitted by a radio or other transmitter, and such tone may be received and applied to a device responsive to that particular frequency for controlling any desired apparatus. Such devices must perform with proper sensitivity at only one frequency, operate within a predetermined time, and perform with stability of all functions over wide temperature ranges. Such a device must also provide isolation of the critical components from external shock and vibration influences, and production in large numbers must be practical from a cost standpoint.

With the trend to miniaturization, it has become desirable to construct such mechanically resonant devices which occupy a minimum of space without detrimentally affecting the qualities necessary for efficient operation. For use in small portable communication units, the resonant device must be correspondingly small. Known systems may be susceptible to outside vibration producing false signals or causing damage. Also, the operation of such systems may be affected by the mass to which the system is mounted, restricting versatility. In addition, known systems may exhibit a frequency shift with amplitude, resulting in improper operation of the device. Furthermore, known systems have been complex and difficult to assemble because of critical tolerance requirements necessary to their operation.

Accordingly, it is an object of this invention to provide an improved electromechanical frequency responsive device which is compact and easily assembled, and wherein tolerance requirements are relaxed.

Another object of the invention is to provide a miniaturized electromechanical frequency responsive translating device in which the frequency of response is independent of the amplitude of the driving signal.

A further object of the invention is to provide a frequency responsive device including a vibratory reed which determines the frequency of response and wherein the frequency of response can be adjusted after the reed is mounted.

Still another object of the invention is to provide a simply constructed miniature electromechanical translating device which has improved isolation of vibrating components and improved damping characteristics with respect to exterior forces.

A feature of the invention is the provision of an electromechanical frequency responsive device having a vibratory member with an elongated permanent magnet mounted transversely thereon, and an inductance winding surrounding one end of the permanent magnet for driving the vibratory member at its resonant frequency of vibration in response to electrical signals of that frequency applied to the winding.

Another feature of the invention is the provision of an electromechanical frequency responsive device having an elongated reed with a permanent magnet transversely mounted on a free end thereof, and having a pair of coils surrounding respective ends of the magnet for respectively driving and sensing resonant vibrations of the elongated reed.

Still another feature of the invention is the provision of a frequency selective device including a chassis carrying a vibratory reed, and driving and sensing coils therefor, with a damping boot around one end of the chassis at the nodal point of the reed, and mounting the chassis to a frame by an integral extension which is flexible in the direction of reed vibration. Springs mechanically connect the other end of the chassis to the frame. The chassis includes a portion to which weight can be added and removed for adjusting the frequency to which the device is responsive.

A further feature of the invention is the provision of a frequency selective device as described in the preceding paragraph wherein the chassis includes a circuit board with conductors each having one end terminating at an edge of the board and connected to one of the coils, and of springs electrically and mechanically connecting the other ends of the conductors in the circuit board to a supporting frame.

A still further feature of the invention is the provision of a mechanical amplitude limiter for damping vibrations of the vibratory reed exceeding a given amplitude.

Figure 1:
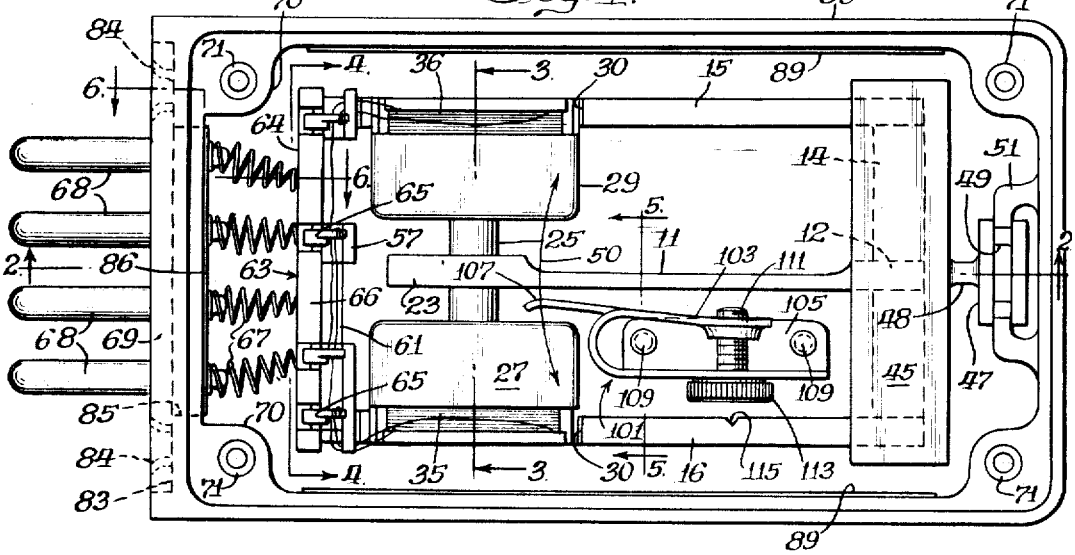
FIG. 1 is an enlarged plan view of an electromechanical resonant translating device constructed in accordance with the invention and with the top cover plate thereof removed.

In accordance with the invention, an electromechanical frequency responsive device includes an elongated vibratory reed having one end mounted to a chassis with the reed being resonant at a predetermined frequency of vibration. An elongated permanent magnet is mounted at its center to the free end of the vibratory reed and extends transversely thereof. A coil surrounds one end of the permanent magnet for displacing the same according to electrical signals of the predetermined frequency applied to the coil to drive the reed into vibration. A second coil may be placed about the other end of the permanent magnet for sensing the vibrations of the reed to produce electrical signals of the predetermined frequency. These latter electrical signals may be used in a feedback circuit to sustain oscillations, as in a selective signalling transmitter, or they may be used to open a selective signalling receiver circuit to reproduce a transmitted signal accompanying signals of the predetermined frequency. Alternatively switch contacts, which close a control circuit in response to vibration of the reed, may be coupled to the reed.

The chassis is mounted in a frame in such a manner as to damp substantially all outside vibrations. A supporting boot surrounds one end of the chassis at the nodal point of the reed, and an integral extension thereon which is flexible in the plane of reed vibration mechanically connects the boot to the frame. The other end of the chassis is mechanically connected to the frame by means of a plurality of coil springs. The coil springs terminate in the ends of conductors carried by a circuit board mounted on the chassis to also provide electrical connection. The other end of the conductors terminate at one edge of the board for simple electrical connection to the coils of the device. A mechanical amplitude limiter is placed adjacent the vibratory reed and has a finger which is engaged by the reed when the reed vibrations exceed a given amplitude. The finger provides frictional contact with the reed and the amplitude limiter is constructed to damp movement of the finger and hence damps the reed when it engages the finger.

In the drawings the electromechanical frequency responsive device is shown greatly enlarged to make the details of the construction more easily understood. In devices constructed in accordance with the invention, the maximum dimension was of the order of 1″. Referring now more particularly to the drawing, the electromechanical frequency responsive device of the invention includes an elongated vibratory reed 11. Reed 11 has a fixed end 12 staked and brazed in a slot in a cross member 14 which extends between the two sides 15 and 16 of channel shaped chassis 17. The reed 11 has increased thickness at the fixed end 12 and the free end 23 thereof so that the required strength is provided at the ends of the thin reed. The unit is constructed so that reed 11 is resonant at a particular predetermined frequency. This frequency depends mainly on the construction of the reed 11 itself, but can be adjusted by changing the mass of the chassis through the addition or removal of material therefrom. To this end, the bottom plate 19 of chassis 17 is provided with a notch 21 in or from which solder or similar material may be added or removed.

The free end 23 of reed 11 has an elongated cylindrical permanent magnet 25 mounted therein. Magnet 25 extends through a hole in the free end 23 of reed 11 and is mounted transversely thereof. Permanent magnet 25, as will be explained, serves as an armature for both driving and sensing the vibrations of reed 11 at the resonant frequency.

A pair of inductance winding assemblies are mounted on the chassis for driving and sensing vibrations in reed 11. These assemblies include exterior shields 27 and 29 which sit in openings 30 in the sides 15 and 16 of chassis 17 and are soldered to the chassis 17 for secure mounting. Bobbins 31 and 32 with coils 35 and 36 would thereon are placed in the respective coil shields 27 and 29, and are maintained therein by a frictional fit within the inner walls of the coil shields. Bobbins 31 and 32 are preferably of some type of resilient material and may be a plastic material such as nylon. Each end of permanent magnet 25 extends through an opening 37 or 38 in respective coil shields 27 and 29. The ends of permanent magnet 25 therefore are surrounded by the respective coils 35 and 36. Shields 27 and 29 have further openings 41 and 42 to permit leads for electrical connection to the coils to pass therethrough. The Q of the device may be varied by inserting conducting sleeves 43 of varying thickness into frictional engagement with the inner walls of bobbins 31 and 32. The sleeves 43 surrounded the ends of magnet 25 and produce fields which damp the motion of reed 11, reducing the effect of external shock and vibration. The effective Q of the device may be reduced in other ways as by providing one or more conductive shorted turns on the windings, loading the input or output coils by connecting resistors thereacross, or varying the number of turns on the coils.

The end of chassis 17 from which reed 11 is suspended is surrounded by a boot 45 of flexible damping material to insulate the chassis from outside vibration and prevent transfer of reed energy to bodies other than the reed structure. Boot 45 surrounds the chassis at cross member 14, which is a nodal point for reed 11. Boot 45 includes an integral extension 47 which, during assembly, is forced into a groove 49 in a channel 51 which is formed in one end of the surrounding frame 53 for the translating device. Boot 45 is preferably of silicon rubber elastomer, although other damping compounds could also be used.

By mounting the chassis by flexible extension 47, damping for all directions of outside shock is accomplished without appreciably damping reed vibrations. Due to the narrow cross-section of the extension at point 48, the extension is very compliant in the horizontal plane so that little damping is afforded to rotational movement of the chassis, in the direction indicated at 50 in FIG. 1, about the part of extension 47 fixed in channel 51. Because such rotational movement is in the same direction as the vibratory movement of reed 11, and because chassis 15 acts similarly to one tine of a tuning fork of which reed 11 is the other tine, any damping of the chassis in such rotational movement would also affect the reed response. If the boot is mounted at the nodal point of the reed and if the resonance frequency of the chassis and mounting is kept substantially below the resonant frequency of the reed, good isolation between reed vibration and the frame will result, even for very low reed frequencies. For example, with the resonance frequency of the chassis and mounting at 30 c.p.s., reed frequencies as low as 65 c.p.s. may be satisfactorily employed without the mass to which the device is mounted having an appreciable effect on reed frequency.

Figure 2:
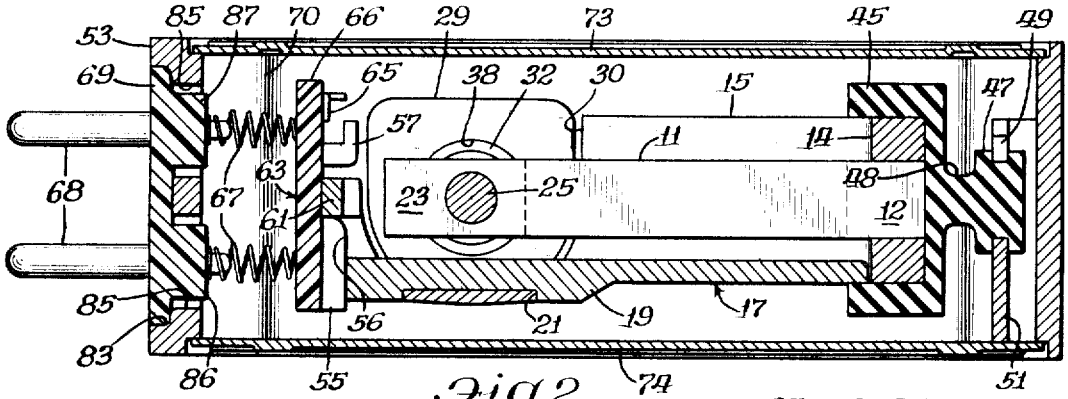
FIG. 2 is a sectional view taken along the line 2—2 of FIG. 1.
Figure 4:
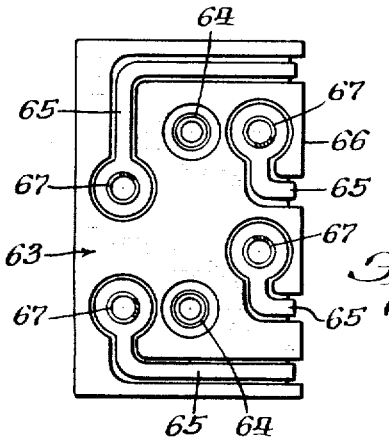
FIG. 4 is a sectional view taken along the line 4—4 of FIG. 1.
Figure 3:
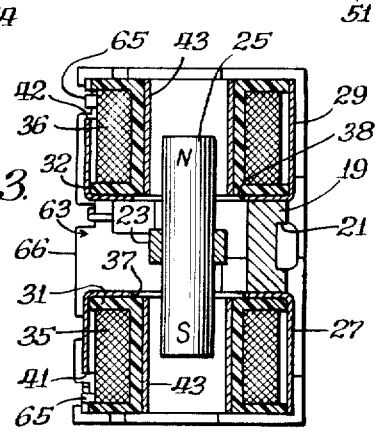
FIG. 3 is a sectional view taken along the line 3—3 of FIG. 1.
Figure 5:
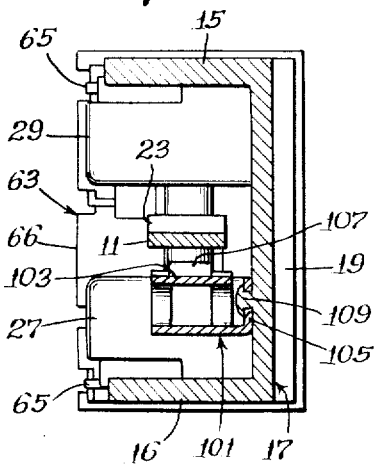
FIG. 5 is a sectional view taken along the line 5—5 of FIG. 1.
Figure 6:
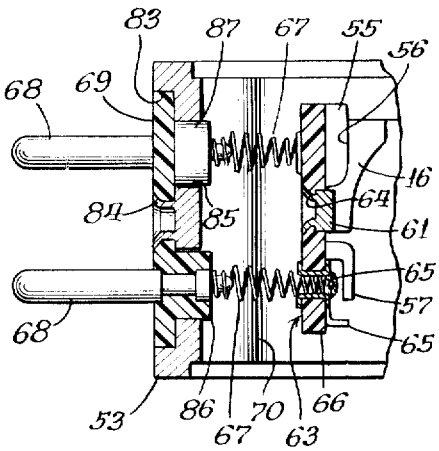
FIG. 6 is a sectional view taken along the line 6—6 of FIG. 1.

Mounting chassis 17 to frame 53 by boot 45 is effective to damp movement of the chassis in the axial direction of the reed and in a direction transverse to the axis of the reed. Furthermore, extension 48 is sufficiently wide compared to its thickness (see FIG. 2) that rotational movement in the vertical plan will be damped. The boot mounting also provides electrical insulation of chassis 17 from frame 53, and extension 47 cooperates with groove 49 to properly locate chassis 15 with respect to frame 53.

A different type of universal shock protecting mounting is provided at the other end of channel shaped chassis 17. An integral cross member 61 extends between the sides 15 and 16 of chassis 17, and a circuit board 63 is mounted thereto by means of rivet projections 64, which are integral with cross member 61. Circuit board 63 is aligned with chassis 17 by shaped protrusions 55 which mate with correspondingly shaped recesses 56 in the walls 15, 16 of chassis 17. Protrusions 55 also provide structural rigidity to board 63. Circuit board 63 carries a plurality of conductors 65 therein. Conductors 65 each have one end terminating at the upper edge 66 of circuit board 63 for easy soldering and inspection. These ends of conductors 65 are attached by wires to the coils 35 and 36. L-shaped projections 57, of varying width, help to guide and locate the leads during the soldering operation.

The other ends of conductors 65 are connected by a plurality of coil springs 67 to plug terminals 68 in a plug terminal board 69 on frame 53. The plug terminal board 69 fits in a recess 83 in a wall of frame 53 and is secured to the frame by integral rivet projections 84 in the same manner as the circuit board 63 is secured to cross member 61 of the chassis. Two transverse slots 85 permit ridges 86 and 87 to project into the interior of the frame to insulate plug terminals 68 from the frame. Springs 67 provide both mechanical and electrical connection of the chassis and circuit board to the frame. They also cooperate with boot 45 to efficiently damp exterior shocks applied to the translating device. Bosses 70 on frame 53 will be struck by board 69 in the event severe shock displaces the chassis far enough. This prevents crushing of springs 67.

During operation at cold temperatures, the springs 67 may contract in diameter tending to change the resonant frequency of the suspension system. To avoid any detrimental effects as a result of this, the material of which boot 45 is constructed is selected to have a high coefficient of expansion. Thus, the projection 47 will tend to shrink during low temperature operation, placing springs 67 under greater tension to offset the effect of a reduction in their diameter. This will maintain the resonant frequency of the suspension system more nearly constant.

Under certain extreme conditions of external shock the inertia force imparted to reed 11 might be sufficient to cause falsing of the unit unless some means of limiting the amplitude of vibrations of reed 11 is provided. The control circuit which the reed triggers may be responsive only to reed output of a given duration so that spurious vibrations in the reed will not ordinarily affect the control circuit. If, however, strong enough forces were permitted to displace the reed sufficiently, enough energy might be stored in the reed to cause it to vibrate longer than the critical period of time, causing a false response in the control circuit.

Such a condition is prevented by means of a mechanical amplitude limiter 101 placed adjacent reed 11. Amplitude limiter 101 comprises a single unitary metal stamping having a generally U shaped portion 103, a mounting flange 105, and a finger 107 extending from U shaped portion 103. The limiter 101 is mounted by flange 105 to the chasis floor on two integral cast rivet projections 109. Projections 109 are of the same type as rivet projections 84 and 64 previously described. The limiter is adjusted by means of an adjusting screw 111 having a knurled knob 113.

The limiter is set so that finger 107 just touches the side of reed 11 at the point of maximum deflection of reed 11 resulting from maximum driving voltage in the driving coil. When extreme shock causes reed 11 to exceed this maximum deflection, the finger 107 slides along the reed's side surface, transferring the reed's kinetic energy into heat and causing the vibrations of the reed to quickly decay. The juncture between finger 107 and U shaped member 103 is coated with a high damping elastomer which transfers additional kinetic energy into heat as finger 107 bends. This supplements the damping effect resulting from frictional engagement between finger 107 and reed 11. Additional damping may be provided by applying adhesive to the side and edges of limiter 101 to absorb flexural strain. In addition to damping excessive motion of reed 11, limiter 101 also prevents excessive voltage from overdriving the reed and overstressing the reed, which might result in early fatigue and a reduction in response frequency.

The sliding action between finger 107 and the side of reed 11 also aids in maintaining the setting of the limiter 101 with respect to reed 11. Spacing therebetween is as close as possible to keep spacing variation due to temperature changes to a minimum. The difference in radius and angular relation between the movement of the tip of finger 107 and reed 11 means that the contact point of finger 107 on the surface of reed 11 will be constantly changing as the finger slides along the reed's side. The first contact between finger 107 and reed 11 will be a minimum force so as not to deform the surface of reed 11 and change the setting. As the reed and finger deflect, their point of contact moves along reed 11 and the force thereat is proportional to the deflection of finger 107. This means that at the greatest deflection of finger 107 with the greatest force at the contact point where deformation of the surface of reed 11 may occur, the contact point will be different from the point of the initial contact. Thus if deformation of the surface of reed 11 occurs at this point, the original setting will not be changed. The limiter 101 is made of a nonmagnetic material so as not to affect the reed's performance due to magnetic attraction between limiter and reed magnet 25. The limiter material also has the maximum possible coefficient of friction with the reed material, providing maximum damping under shock.

The result of the limiter is to insure a rapid decay time of reed vibration resulting from exterior shock to prevent falsing of the unit. The natural frequency of vibration of the finger 107 is at least twice the frequency of vibration of the reed. This insures that on the reverse motion of the reed after shock, that is as reed 11 moves away from finger 107, the finger and the reed will stay in engagement to transfer more kinetic energy into heat. Furthermore, the foregoing frequency relationship eliminates any change in the contact setting that might occur because of a resonance with a reed frequency, and eliminates any loss of reed energy due to resonance of the limiter itself.

A notch 115 is provided on the edge of chassis 15 adjacent to knurled head 113 of screw 111. The limiter is preset by turning the screw 111 until the tip of finger 105 just touches reed 11 when the reed is at rest. The screw 111 is then backed off to the required spacing by turning knurled head 113 on which the teeth spacing is calibrated with screw pitch. By counting the number of teets passing notch 115, a very accurate setting of limiter 101 may easily be attained for optimum amplitude limiting operation.

The frame 53 which surrounds chassis 17 is cast with a plurality of integral rivet projections 71 at the corners thereof. The top plate 73 and the bottom plate 74, which may be magnetic shields, are fastened to the rest of frame 53 by means of the described rivet portions. Thus as was the case with the mounting of circuit board 63 and plug terminal board 69, no separate hardware such as rivets, eyelets or screws, is necessary in the final assembly operation. A pair of shield plates 89 of magnetic material are attached to respective inner walls of frame 53 by a suitable adhesive. Shield plates 89 provide a shield for the reed 11 from external magnetic fields and also confine the field of magnet 25 inside the frame so that outside components will not be affected. The distance from the plates 89 to magnet 25 is sufficient to maintain a low attracting force between the plates and magnet 25 so that reed performance is not appreciably affected. If the plates are backed by adhesive, assembly is facilitated.

By using a single reed with a single permanent magnet having each of its ends inside a respective coil, and by electrically connecting the coils properly, input and output signals will always be precisely in phase. Furthermore, the ends of the permanent magnet are always inside the respective coils. The permanent magnetic field therefore cuts the maximum number of turns of the coil during its motion, and it is always cutting turns as it moves and is never beyond the limit of the coils. This is assured by the placement of the coil shields on either side of the reed 11 at a distance therefrom which is less than half the length of the coils. The reed is therefore limited in its movement in either direction by striking the coil shield. This motion of the magnet results in both efficiency and linearity of the translation of the electrical signals to mechanical motion and vice versa. The linear variation in the field results in a frequency response which is symmetrical and renders the driving force required independent of the deflection.

Figure 7:
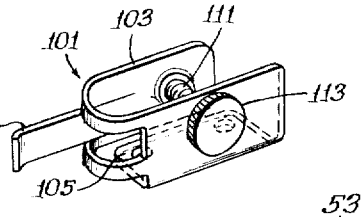
FIG. 7 is a perspective view of the amplitude limiter of the device.
Figure 8:
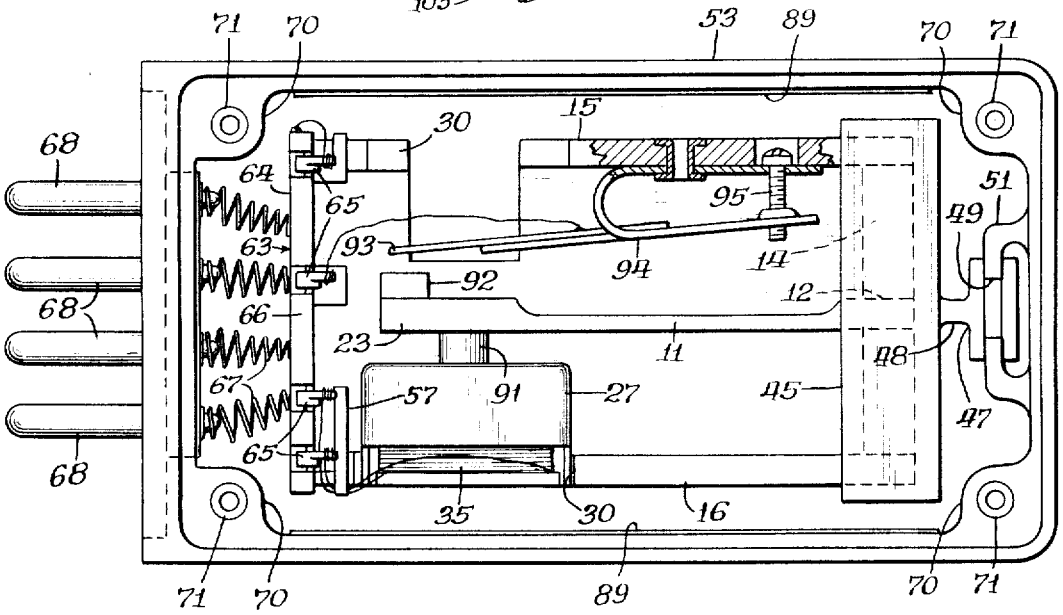
FIG. 8 is an enlarged top plan view of another embodiment of the invention, with the top cover plate removed.

An alternative embodiment of the invention is shown in FIG. 7. Here only one coil is used to drive the reed, and a permanent magnet 91 projects from one side of the reed 11. In place of a second coil assembly for sensing the vibrations of reed 11, a contact 92 is provided on reed 11, the reed being grounded to the chassis. A second contact 93 is mounted to be engaged by contact 92 when the reed 11 vibrates sufficiently due to being driven by coil 35 at the resonant frequency of the reed. Contact 93 is suspended by a resilient insulated mount 94 secured to the side 15 of chassis 17. A screw 95 permits adjustment of contact 93. Electrical connection is made from contact 93 to one of the conductors 65 in circuit board 63. Closure of contacts 92 and 93 may be used to close a circuit carrying a control signal. Although closure of the contacts is intermittent, any deleterious effects may be avoided by using an appropriate storage circuit as is well known in the art.

It may therefore be seen that the invention provides an extremely small electromechanical frequency responsive device wherein the driving magnetic field is linear and the frequency response is symmetrical. The device is simple of construction and easily assembled, and provides improved isolation of vibrating components and damping of exterior forces applied to the translating device. Because damping and isolation of vibrating components becomes very critical at small physical dimensions, the improvement therein afforded by the present invention has enabled construction of a device wherein its maximum exterior dimension is of the order of only one inch.

We claim:

[1. An electromechanical frequency responsive device including in combination, a vibratory member, means mounting said member so that it is resonant at a predetermined frequency of vibration, an elongated permanent magnet mounted intermediate the ends thereof to said vibratory member and extending transversely thereof, winding means of a given length surrounding one end of said permanent magnet, means connected to said winding means for applying signals thereto, whereby signals of the predetermined frequency applied to said winding means produce a field to displace said one end of said permanent magnet and cause said vibratory member to vibrate at the predetermined frequency and means for limiting the amplitude of vibration of said vibratory member to prevent displacement of said one end of said permanent magnet beyond the extremities of said winding means.]

2. [An] *A compact* electromechanical frequency responsive device including in combination, a rectangular chassis, an elongated vibratory reed within said chassis and rigidly supported at one end thereof on said chassis, said vibratory reed being resonant at a predetermined frequency of vibration, an elongated permanent magnet mounted at its center to the unsupported end of said vibratory reed and extending transversely thereof, a coil supported on said chassis and surrounding one end of said permanent magnet, [and] means connected to said coil for applying signals thereto to displace said one end of said permanent magnet whereby signals cause said vibratory reed to build up vibrations at the predetermined frequency, *frame means about said rectangular chassis and including conducting pins for supporting the same and making electrical connections to said coil, and resilient means supporting said chassis from said frame means and including conducting means for connecting said coil to said pins, said resilient means providing resilient suspension of said chassis for insulating said vibratory reed from exterior shock and for preventing transfer of reed energy to said frame means, said frame means having a maximum dimension of the order of one inch or less.*

3. An electromechanical frequency responsive device including in combination, a *rectangular channel shaped chassis, an elongated* vibratory member, means for mounting said vibratory member *within said chassis* so that it is resonant at a predetermined frequency of vibration, an elongated permanent magnet mounted intermediate its ends to said vibratory member and extending transversely thereof, a pair of [winding means] *windings* each surround a respective end of said permanent magnet, *a conductive shield about each of said windings, a housing enclosing and supporting said chassis, resilient means supporting said chassis from said housing and including first conductive spring* means connected to one of said winding means for applying electrical signals thereto to drive said vibratory member in vibration in response to signals of the predetermined frequency, *said resilient means including second conductive spring* means connected to the other of said winding means for conducting therefrom electrical signals at the predetermined frequency produced by movement of said permanent magnet in said other of said winding means, and means for limiting the amplitude of vibration of said vibratory member to prevent displacement of the ends of said permanent magnet beyond the extremities of said coils.

4. An electromechanical frequency responsive device including in combination, *a housing,* a chassis *within said housing,* an elongated vibratory reed rigidly supported at one end thereof on said chassis, with said vibratory reed being resonant at a predetermined frequency of vibration, an elongated permanent magnet mounted at a portion between its ends to the unsupported end of said vibratory reed and extending transversely thereof, a pair of induction coils *on said chassis and* each surrounding a respective end of said permanent magnet, *conductive means coupled to each of said coils for damping motion of said permanent magnet and resilient means supporting said chassis from said housing and including first and second conducting spring means, said first conductive spring* means *being* connected to one of said coils for applying electrical signals thereto so that signals of the predetermined frequency will displace said permanent magnet and drive said vibratory reed in vibration at the predetermined frequency, said permanent magnet causing the generation of signals at the predetermined frequency in the other of said coils in response to vibration of said reed, [and] *said second conductive spring* means *being* connected to the other of said coils for conducting electrical signals therefrom.

5. An electromechanical frequency responsive device including in combination, a chassis, an elongated vibratory member supported at one end thereof on said chassis said vibratory member having a predetermined resonant frequency of vibration with respect to said chassis, means on said chassis for providing a varying mass to adjust the resonant frequency of vibration of said vibratory member, an elongated permanent magnet mounted at a portion between its ends to the unsupported end of said vibratory member and extending transversely thereof, winding means surrounding one end of said permanent magnet, and means connected to said winding means for applying electrical signals thereto to displace said one end of said permanent magnet and drive said vibratory member in vibration in response to signals at the predetermined frequency.

6. An electromechanical frequency responsive device including in combination, a chassis, a vibratory reed supported at one end thereof on said chassis, said vibratory reed being resonant at a predetermined frequency of vibration, an elongated permanent magnet mounted at a portion between its ends to the unsupported end of said vibratory reed and extending transversely thereof, a coil surrounding one end of said permanent magnet, means connected to said coil for applying electrical signals thereto to displace said permanent magnet and drive said vibratory reed in vibration in response to signals at the predetermined frequency, and means coupled to said coil forming a closed conductive path about said one end of said permanent magnet to provide a field for damping motion of said permanent magnet.

7. An electromechanical frequency responsive device including in combination, a vibratory reed, a chassis supporting one end of said vibratory reed with said vibratory reed being resonant at a predetermined frequency of vibration, an elongated permanent magnet mounted at a portion between its ends to the unsupported end of said vibratory reed and extending transversely thereof, a coil surrounding one end of said permanent magnet, means connected to said coil for applying electrical signals thereto to displace said one end of said permanent magnet and drive said vibratory member in vibration in response to signals at the predetermined frequency, and a conductive sleeve mounted within said coil and surrounding said one end of said permanent magnet.

8. An electromechanical frequency responsive device including in combination, a vibratory member and means for mounting said vibratory member with said vibratory member being resonant at a predetermined frequency of vibration, an elongated permanent magnet mounted at a portion between its ends to said vibratory member and extending transversely thereof, a pair of coils surrounding respective ends of said permanent magnet for respectively driving and sensing vibrations of said vibratory member at the predetermined frequency, a chassis supporting said vibratory member and said pair of coils, a circuit panel on said chassis and having a plurality of conductors thereon each having a first and second end with said first ends terminating at one edge of said panel, means electrically connecting said first ends of said conductors to said coils, a frame for supporting said chassis, and a plurality of conductive coil springs connecting said second ends of said conductors to said frame for providing both mechanical and electrical connection thereto.

9. An electromechanical frequency responsive device including in combination, a supporting frame, an elongated chassis, an elongated vibratory reed supported at one end thereof on one end of said chassis, said vibratory reed being resonant at a predetermined frequency of vibration, an elongated permanent magnet mounted at a portion between its ends to the unsupported end of said vibratory reed and extending transversely thereof, a pair of induction coils surrounding respective ends of said permanent magnet, means connected to one of said coils for applying electrical signals thereto to displace said permanent magnet, whereby said vibratory reed is driven in vibration by signals at the predetermined frequency, means connected to the other of said coils for conducting therefrom electrical signals of the predetermined frequency produced by movement of said permanent magnet therein at the predetermined frequency, a resilient boot surrounding said chassis at the end thereof supporting said vibratory reed, said resilient boot having an integral flexible extension thereon mounted to said frame, a circuit panel mounted on said chassis at the end thereof opposite said boot and having a plurality of conductors thereon each having a first end terminating at one edge of said panel and electrically connected to one of said coils, and a second end terminating at one side of said panel, and a plurality of conducting coil springs connecting said second ends of said conductors to said frame for providing both mechanical and electrical connection between said chassis and said frame.

10. An electromechanical frequency responsive device including in combination, a vibratory member and a chassis for suspending said vibratory member to be resonant at a predetermined frequency of vibration, an elongated permanent magnet mounted at a portion between its ends to said vibratory member and extending transversely thereof, a coil shield fixed to said chassis proximate one end of said permanent magnet, a bobbin force fit in said coil shield and having a coil wound thereon to surround said one end of said permanent magnet, and means connected to said coil for applying electrical signals thereto to displace said one end of said permanent magnet in response to signals of the predetermined frequency and drive said vibratory member in vibration at the predetermined frequency.

11. An electromechanical frequency responsive device including in combination, an elongated vibratory reed and a chassis supporting one end thereof with said vibratory reed being resonant at a predetermined frequency of vibration, an elongated permanent magnet mounted at a portion between its ends to the unsupported end of said vibratory reed and extending transversely thereof, a pair of induction coil assemblies *on said chassis* including induction coils surrounding respective ends of said permanent magnet, said induction coil assemblies being spaced from said vibratory reed a distance which is less than one half of the length of said induction coils to be engageable with said vibratory reed to limit the amplitude of vibration thereof, *a circuit panel on said chassis and having first and second conductor means thereon, said first conductor* means *being* connected to one of said coils for applying electrical signals thereto to displace said permanent magnet in response to signals of the predetermined frequency and drive said vibratory reed in vibration at the predetermined frequency, said permanent magnet causing the generation of signals at the predetermined frequency in the other of said coils in response to vibration of said reed, [and] *said second conductor* means *being* connected to the other of said coils for conducting electrical signals therefrom, *a frame for supporting said chassis and having plug terminals mounted thereon, and resilient means supporting said chassis on said frame and including a plurality of conductive coil springs connecting said circuit panel to said plug terminals for providing both mechanical and electrical connections therebetween.*

12. An electromechanical frequency responsive device including in combination, an elongated vibratory reed [and a], *a rectangular channel shaped* chassis supporting one end [thereof] *of said reed* with said vibratory reed being resonant at a predetermined frequency of vibration, an elongated permanent magnet mounted to the unsupported end of said vibratory reed and extending transversely thereof, a coil of a given length surrounding one end of said permanent magnet, means connected to said coil for applying signals thereto to displace said one end of said permanent magnet in response to signals of the predetermined frequency and drive said vibratory reed in vibration at the predetermined frequency, means for limiting the amplitude of vibration of said vibratory reed to prevent displacement of said one end of said permanent magnet beyond the extremities of said coil, a first contact mounted on said reed, a second contact positioned proximate said first contact to be engaged thereby upon vibration of said vibratory reed at the predetermined frequency, and means for connecting said first and second contacts in a control circuit for closing the control circuit in response to vibration of said reed at the predetermined frequency.

13. An electromechanical frequency responsive device including in combination, an elongated vibratory reed, an elongated chassis supporting one end of said vibratory reed, said vibratory reed being resonant at a predetermined frequency of vibration, electromagnetic means for respectively driving and sensing vibrations of said vibratory reed at the predetermined frequency, a frame for supporting said chassis, a resilient member coupling said chassis to said frame at the end of said chassis supporting said vibratory reed, said resilient member having a portion aligned with said reed, which is flexible and of substantially greater compliance in the direction of vibration of said reed than in other directions, and spring means connecting the opposite end of said chassis to said frame, said resilient member and said spring means providing resilient suspension of said chassis in said frame for insulating said reed from exterior shock and for preventing transfer of reed energy to said frame, with said reed and said chassis operating as a unit being isolated from said frame.

14. An electromechanical frequency responsive device including in combination, an elongated vibratory reed, an elongated chassis supporting one end of said vibratory reed, said vibratory reed being resonant at a predetermined frequency of vibration, an elongated permanent magnet mounted to said vibratory reed at the free end thereof and extending transversely thereof, a coil mounted on said chassis and surrounding one end of said permanent magnet for driving said vibratory reed at the predetermined frequency, a frame for supporting said chassis, a resilient member coupling said chassis to said frame at the end of said chassis supporting said vibratory reed, said resilient member having a portion aligned with said reed and which is flexible and of substantially greater compliance in the direction of vibration of said reed than in other directions, and spring means connecting the opposite end of said chassis to said frame, said resilient member and said spring means providing resilient suspension of said chassis from said frame for insulating said reed from exterior shock and for preventing transfer of reed energy to said frame.

15. An electromechanical frequency responsive device including in combination, an elongated vibratory reed having first and second ends, an elongated chassis supporting said first end of said vibratory reed, said vibratory reed being resonant at a predetermined frequency of vibration, an elongated permanent magnet mounted at a portion between its ends to said vibratory reed at said second end thereof and extending transversely thereof, a pair of coils mounted on said chassis and surrounding respective ends of said permanent magnet for respectively driving and sensing vibrations of said vibratory reed at the predetermined frequency, a frame for supporting said chassis, a resilient member coupling said chassis to said frame at the end of said chassis supporting said vibratory reed, said resilient member having a portion aligned with said reed which is of substantially less thickness in the direction of vibration of said reed than in other directions to thereby damp movement of said reed in directions other than the direction of vibration of said reed, and spring means connecting the opposite end of said chassis to said frame, said resilient member and said spring means providing resilient suspension of said chassis in said frame for insulating said reed from exterior shock and for preventing transfer of reed energy to said frame, with said reed and said chassis operating as a unit being isolated from said frame.

16. An electromechanical frequency responsive device including in combination, an elongated vibratory reed, an elongated chassis for suspending one end of said vibratory reed, said vibratory reed being resonant at a predetermined frequency of vibration, an elongated permanent magnet mounted at a portion between its ends to said vibratory reed and extending transversely thereof, a pair of coils mounted on said chassis and surrounding respective ends of said permanent magnet for respectively driving and sensing vibrations of said vibratory reed at the predetermined frequency, a frame for supporting said chassis, a resilient boot surrounding said chassis at the end thereof adjacent the supported end of said vibratory reed, said resilient boot having an integral extenison thereon mounted to said frame and flexible in the direction of vibration of said reed, and a plurality of springs connecting the end of said chassis opposite said boot to said frame, said boot and said springs providing resilient suspension of said chassis in said frame for insulating said reed from exterior shock and for preventing transfer of reed energy to said frame, with said reed and said chassis operating as a unit being isolated from said frame.

17. An electromechanical frequency responsive device including in combination, an elongated vibratory reed, a chassis supporting said reed at one end thereof with said vibratory reed being resonant at a predetermined frequency of vibration, electromagnetic means coupled to said reed for driving said reed at the predetermined frequency and at amplitudes not exceeding a given value, means for sensing vibrations of said reed, and an amplitude limiting device mounted to said chassis adjacent said reed and having a finger extending therefrom to be engageable with said reed when the vibrations thereof exceed the given amplitude, said finger wiping along the side of said reed to produce frictional damping of the vibrations thereof.

18. An electromechanical frequency responsive device including in combination, an elongated vibratory reed, a chassis supporting said reed at one end thereof with said vibratory reed being resonant at a predetermined frequency of vibration, electromagnetic means coupled to said reed for driving said reed at the predetermined frequency and at amplitudes not exceeding a given value, means for sensing vibrations of said reed, and an amplitude limiting device mounted to said chassis adjacent said reed, said device comprising an integral resilient member of nonmagnetic material and having a finger extending therefrom to be engageable with said reed when the vibrations thereof exceed the given amplitude, said finger wiping along the side of said reed to produce frictional damping of the vibrations thereof, said device having damping material on the surface thereof and having a resonant frequency at least twice the predetermined frequency.

*19. An electromechanical frequency responsive device in accordance with claim 11 wherein said frame has bosses thereon positioned to be engaged by said circuit panel to prevent crushing of said coil springs.*

References Cited

The following references, cited by the Examiner, are of record in the patented file of this patent or the original patent.

UNITED STATES PATENTS

| | | | |
|---|---|---|---|
| 2,777,950 | 1/1957 | Doremus | 331—156 X |
| 2,938,420 | 5/1960 | Kunz | 84—1.15 |
| 2,951,910 | 9/1960 | Bauman | 179—87 |
| 2,688,059 | 8/1954 | Holzinger et al. | 200—91 |
| 3,127,117 | 3/1964 | Mappes | 339—93 |
| 2,974,265 | 3/1961 | Thoma | 310—32 X |
| 3,071,007 | 1/1963 | Bjorn et al. | 331—156 |

FOREIGN PATENTS

| | | |
|---|---|---|
| 434,763 | 9/1935 | Great Britain. |

BERNARD A. GILHEANY, *Primary Examiner.*

LARAMIE E. ASKIN, *Examiner.*

H. BROOME, *Assistant Examiner.*